June 9, 1931. H. PERROT ET AL 1,809,568

BRAKE

Filed Feb. 2, 1929

INVENTOR
Henri Perrot
Germain Calvignac
BY
ATTORNEY

Patented June 9, 1931

1,809,568

UNITED STATES PATENT OFFICE

HENRI PERROT, OF PARIS, FRANCE, AND GERMAIN CALVIGNAC, OF MANNHEIM, GERMANY, ASSIGNORS, BY MESNE ASSIGNMENTS, TO BENDIX AVIATION CORPORATION, OF NEW YORK, N. Y., A CORPORATION OF DELAWARE

BRAKE

Application filed February 2, 1929, Serial No. 337,127, and in France September 26, 1928.

This invention relates to brakes, and is illustrated as embodied in an internal expanding automobile brake. An object of the invention is to provide a simple floating cam or equivalent brake-applying device, which can shift to center itself, but which is held rigidly against bodily movement at right angles to the direction of the centering movement.

Preferably the brake-applying device has a portion, which may be flattened at its end, projecting into a slot across the end of the operating shaft, and there pivoted or jointed to the operating shaft, so that it can shift bodily only crosswise of the slot. The operating shaft may be journaled in a bearing on the outside of the brake backing plate, with the novel camshaft projecting through the backing plate into the above-described slot in the operating shaft.

The above and other objects and features of the invention, including various novel combinations of parts and desirable particular constructions, will be apparent from the following description of one illustrative embodiment shown in the accompanying drawings, in which.

Figure 1:
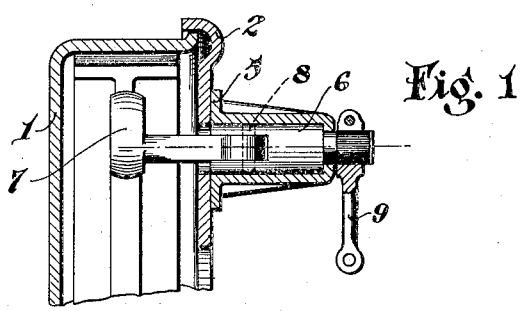
Figure 1 is a central vertical section through the upper part of the brake, showing the two shafts.
Figure 2:
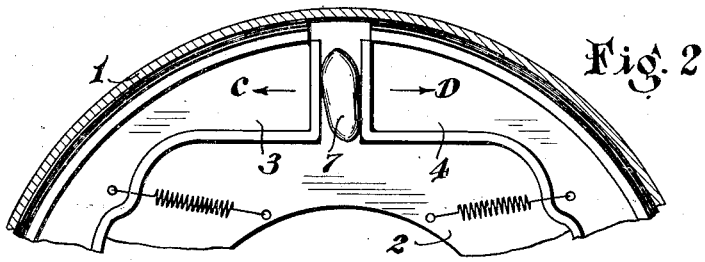
Figure 2 is a vertical section through the upper part of the brake, at right angles to Figure 1, and just inside the head of the brake drum, and showing the brake shoes in side elevation.
Figure 3:
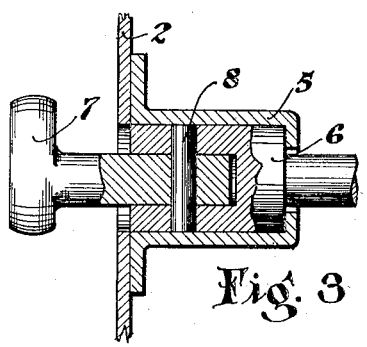
Figure 3 is an enlarged vertical section showing the jointing together of the shafts.
Figure 4:
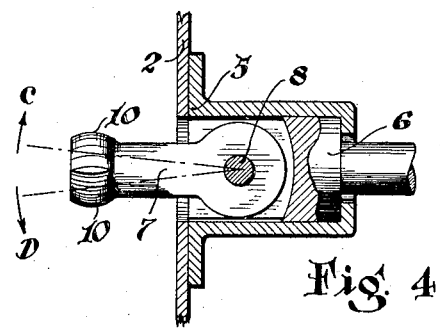
Figure 4 is an enlarged horizontal section showing the jointing together of the shafts.
Figure 5:
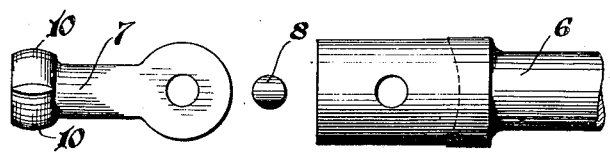
Figure 5 is a top plan view of the two shafts and the pivot used in jointing them together, but separated from each other.
Figure 6:
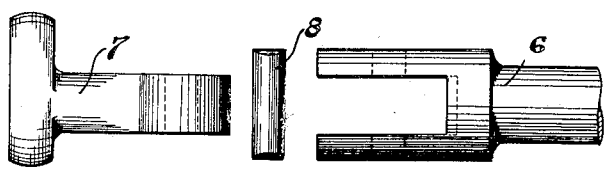
Figure 6 is a side elevation of the two shafts and the pivot.

The illustrated brake includes a drum 1, at the open side of which is a support such as a backing plate 2, and within which are shoes 3 and 4 or equivalent friction means having adjacent ends which are separated to apply the brake.

A bearing 5 is fixedly secured to the backing plate 2, preferably on the side opposite the friction means, a novel operating shaft 6 being journaled in this bearing and operated by means such as a lever or arm 9.

Shaft 6 is formed with a slot extending crosswise of its end, and arranged substantially horizontally when the brake is applied. The brake is applied by a device such as a cam 7 arranged between the ends of the shoes, and having a shaft portion projecting through the backing plate 2 into the slot in the end of shaft 6.

The end of the shaft portion of cam 7 is preferably flattened, to be embraced between the walls of the slot in shaft 6, and it may be formed with an opening for a vertical pivot or pin 8 extending into alined openings in shaft 6 and jointing the two shafts together.

Thus cam 7 may float crosswise, bodily, to center itself and balance the pressures on the two shoes, while at the same time it forces the shoes in the opposite directions "C" and "D" to apply the brake. The cam is suitably rounded as shown at 10, so that it remains in effective operating engagement with the shoes even if it has shifted slightly. The walls of the slot in shaft 6 support the cam against any bodily movement in a vertical direction.

While one illustrative embodiment has been described in detail, it is not our intention to limit the scope of the invention to that particular embodiment, or otherwise than by the terms of the appended claims.

We claim:

1. A brake comprising, in combination, friction means having separable ends, a bearing adjacent said ends, a shaft having a slotted end journaled in the bearing, and a cam between said ends having a flattened shaft portion pivoted in said slot.

2. A brake comprising, in combination, friction means, a shaft formed with a transverse slot, a bearing for the shaft housing the slotted portion and a cam operating the friction means having a flattened shaft portion pivoted in said slot.

3. A brake comprising, in combination, friction means, a shaft formed with a transverse slot, a bearing for the shaft housing the transversely slotted portion thereof and a brake-applying device operating the friction means having a flattened shaft portion pivoted in said slot.

4. A brake comprising, in combination, a drum, a backing plate at the open side of the drum, friction means within the drum, a bearing secured to the backing plate on the side opposite the friction means, a shaft having one end journaled in said bearing, and a brake-applying device operating the friction means having a portion projecting through the backing plate and inside the bearing and there jointed to the shaft.

5. A brake comprising, in combination, a drum, a backing plate at the open side of the drum, friction means within the drum, a bearing secured to the backing plate on the side opposite the friction means, a shaft having one end journaled in said bearing having a slot across the end, a brake-applying device operating the friction means and having a portion projecting through the backing plate and into said slot.

6. A brake comprising a backing plate, a drum associated therewith, friction means positioned for movement on the plate having separable ends and adaptable for co-operation with the drum, a bearing positioned on the backing plate, a shaft having an enlarged slotted end portion journalled in the bearing, a cam between the ends of the friction means having a portion pivoted in the slot in the enlarged end of the shaft.

7. A brake comprising a backing plate, a drum associated therewith, friction means positioned for movement on the backing plate and adaptable for co-operation with the drum, a bearing secured to the backing plate, a shaft having enlarged end portions provided with a diametral slot, the slotted end portion of the shaft positioned in the bearing and a brake applying device for operating the friction means having a portion pivoted in the diametral slot in the end of the shaft.

In testimony whereof, I have hereunto signed my name.
              HENRI PERROT.

In testimony whereof, I have hereunto signed my name.
              GERMAIN CALVIGNAC.